United States Patent
DeCaluwe et al.

(10) Patent No.: US 6,490,347 B2
(45) Date of Patent: *Dec. 3, 2002

(54) METHOD AND APPARATUS FOR PROVIDING TELECOMMUNICATIONS TRUNK GROUP SELECTION FOR USE IN A PUBLIC NETWORK IN ACCORDANCE WITH CUSTOMER PREFERENCE

(75) Inventors: Craig L. DeCaluwe, Naperville; Robert G. Demmert, St. Charles; Joseph Kohler, Woodridge; Patricia A. Litzo, Warrenville; Joseph H. McCarthy, Orland Park, all of IL (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,246

(22) Filed: Apr. 24, 1998

(65) Prior Publication Data

US 2001/0040952 A1 Nov. 15, 2001

(51) Int. Cl.⁷ .................................................. H04M 3/42
(52) U.S. Cl. ............................. 379/211.01; 379/127.01; 379/207.15; 379/211.02; 379/221.01
(58) Field of Search .................................. 379/240, 241, 379/219, 220, 207, 209, 309, 266, 265, 211, 221, 112.09, 231, 232, 127.01, 207.15, 221.01

(56) References Cited

U.S. PATENT DOCUMENTS

| | | | | |
|---|---|---|---|---|
| 5,136,636 A | * | 8/1992 | Wegrzynowicz | 379/221.01 |
| 5,168,515 A | * | 12/1992 | Gechter et al. | 379/265.04 |
| 5,226,075 A | * | 7/1993 | Funk et al. | 379/221 |
| 5,291,550 A | * | 3/1994 | Levy | 379/242 |
| 5,392,344 A | * | 2/1995 | Ash et al. | 379/221 |
| 5,539,817 A | * | 7/1996 | Wilkes | 379/230 |
| 5,559,877 A | * | 9/1996 | Ash et al. | 379/221 |
| 5,577,113 A | * | 11/1996 | Bray et al. | 379/220.01 |
| 5,588,048 A | * | 12/1996 | Neville | 379/127.01 |
| 5,657,383 A | * | 8/1997 | Gerber et al. | 379/266 |
| 5,696,809 A | * | 12/1997 | Voit | 379/265 |
| 5,703,943 A | * | 12/1997 | Otto | 379/209 |
| 5,768,360 A | * | 6/1998 | Reynolds et al. | 379/220 |
| 5,805,688 A | * | 9/1998 | Gillespie et al. | 379/221.08 |
| 5,878,130 A | * | 3/1999 | Andrews et al. | 379/265 |
| 5,943,413 A | * | 8/1999 | Ash et al. | 379/220 |

* cited by examiner

Primary Examiner—Ahmad F. Matar
Assistant Examiner—Bing Bui

(57) ABSTRACT

A method of providing for customer selection of a circuit selection algorithm for use in a public network comprises the steps of storing a plurality of circuit selection algorithms in public network memory, translating a routing number for a call into customer data, matching the customer data with a trunk block circuit selection algorithm and controlling the delivery of calls to a customer in accordance with the trunk block circuit selection algorithm. The customer may also custom design their own circuit selection algorithm and input their custom designed algorithm into public network memory along with others for selection in accordance with their customer criteria, for example, time of day or day of week, low traffic period, high traffic period or other criteria. Apparatus for providing for customer selection of a circuit selection algorithm for use in a public network comprises a public network memory for storing a plurality of circuit selection algorithms and a controller for translating a routing number for a call into customer data, matching the customer data with a circuit selection algorithm and controlling the delivery of calls to a customer in accordance with the circuit selection algorithm. The apparatus preferably comprises a switching center for toll or local call switching.

8 Claims, 4 Drawing Sheets

METHOD AND APPARATUS FOR PROVIDING TELECOMMUNICATIONS TRUNK GROUP SELECTION FOR USE IN A PUBLIC NETWORK IN ACCORDANCE WITH CUSTOMER PREFERENCE

BACKGROUND OF THE INVENTION

1. Technical Field

The present invention relates to the field of telecommunications trunk group selection and, more particularly, to providing telecommunications trunk group selection in accordance with customer preferences.

2. Description of the Related Arts

In the field of telecommunications switch design, it is well known to provide for the selection of idle trunks or other circuits such as service circuits for connecting calls to customers. The customer, for example, may be the provider of an airline reservation system. Such an airline reservation system may be provided via an automatic call distributor for distributing calls to service representatives manning service positions. To provide for the great number of incoming calls to such an airline reservation system, a plurality of trunk groups incoming to the customer may be provided from a toll switch through a local exchange carrier to the customer. Each trunk group may contain multiples of twenty-four trunks which may comprise, for example, T1 carrier channels.

Referring to FIG. 1, there is shown a toll network 100 comprising a plurality of toll switches such as toll switch 110. By way of example, toll switch 110 may comprise a #4ESS switch of Lucent Technologies, Inc. Toll trunks connect toll switch 110 with other toll offices via trunk circuits and facilities such as trunks of trunk groups 111 or 112. A network adjunct 115 may provide adjunct services in toll network 100 such as voice response unit (VRU) and dual tone multi-frequency (DTMF) signaling, reception and translation.

A caller desirous of obtaining an airline reservation may dial an incoming WATS telephone number such as 1-800-555-AIRS. Once the dialed number is received at an originating toll central office, for example, a #4ESS, the dialed number is translated into a routing number so that the caller may be routed through the network 100 to the customer interface 160. When the call reaches the destination toll switch 110, the several incoming trunk groups (four are shown) 125 are provided for connecting the caller via local exchange carrier (LEC) 150. Each trunk group, for example trunk group 120, may comprise twenty-four trunks, hereinafter referred to as blocks of trunks. Of the trunks in trunk group 120, several may be already busy and in use by other callers and some may be free.

Referring briefly to FIG. 2, there are pictorially represented N trunk blocks twenty-four (24) trunk circuits each, by way of example. Referring to trunk group 1, there are shown an indication of busy/idle status for all twenty-four trunks in each trunk block. The problem of the present invention relates to how to expeditiously pick an idle trunk circuit of a trunk block and how to pick a trunk block for selecting an idle trunk.

There are many and various ways of selecting a trunk block and an idle trunk. Typically, a toll switch will hunt for an idle trunk in blocks of twenty-four trunks. In the depicted example of FIG. 1, it may be assumed that there exist four trunk blocks of twenty-four trunks each. There may be a link list and a hunt list. The trunk blocks are maintained on a link list in memory. In one trunk selection algorithm, the trunk blocks may be jumbled, for example: 4, 2, 1, 3; in another, the trunk blocks may be in order, for example: 1, 2, 3, 4. One may continue to use trunk block #1 with each incoming call to the switch 110, for example, during low traffic periods when there are mostly idle trunks. It may be that the customer desirably wishes to have evenly spaced traffic over all the trunks of all the trunk blocks. In an alternative algorithm, the switch may hunt sequentially through all the trunk blocks until an idle trunk is found and then continue from that point with the next incoming call to be connected.

Continuing to track a given call to a customer 160, a trunk circuit is selected by a predetermined algorithm according to the prior art and the caller is connected typically to a voice response unit 161, such as a Lucent Conversant(TM) system. The system 161 speaks to the caller, prompts for a response and determines a caller selection, for example, from DTJF input, such as international reservations, and then an automatic call distributer of,customer interface 160, not shown, connects the call to an international service representative.

Certain customers may want a first in first out (FIFO) means of selecting trunks so that calls may be evenly dispersed among serving voice response units 161 on the customer premises. Others may want still other algorithms for trunk/trunk block selection. The trunk circuit selection algorithms known in the art comprise, for example, the following: lowest idle circuit first, highest idle circuit first, A- sequential (on the first call, select the first circuit, then the second circuit and so on), least used circuit, longest idle circuit, normal #4ESS selection algorithm and custom circuit selection. Others include most idle, least hunted; most busy, most hunted; and circular trunk hunt or circuit selection. Trunk circuit selection algorithms are many and varied and only limited by the imagination.

As suggested by these different types, the circuit selection algorithm may be switch dependent. That is, a #4ESS may have a preferred trunk circuit selection algorithm and a Northern Telecom digital multiplex switch a different one. In fact, there may be different trunk selection algorithms performed by each switch manufacturer: Siemens, Ericcson, Stromberg Carlson, Fujitsu and so on. Presently, trunk circuit selection algorithms may be switch dependent, that is, each manufacturer may prefer their own.

Since customers may not wish to be tied down to specific circuit selection algorithms, there remains a problem with the present telecommunications network that circuit selection algorithms, although many different algorithms exist, cannot be selected by customers or otherwise selected, for example, by time of day, traffic usage, day of week or circuit or trunk type.

SUMMARY OF THE INVENTION

In accordance with the principles of the present invention, the problems of prior art telecommunication network circuit selection criteria are solved by providing a plurality of circuit selection algorithms at a switching center that may be associated with a customer by the customer's directory or routing number. Consequently, upon routing a call to the customer, a circuit selection algorithm selected and predetermined by the customer from the plurality of available and different algorithms may be applied for routing calls to that customer. Apparatus for providing a customer selectable circuit selection algorithm includes the provision in memory at the switching center of a table of possible different circuit selection algorithms, input means for receiving customer preferences and a controller for operatively connecting calls to the customer via circuits selected according to the predetermined selected circuit selection algorithm, predetermined by the customer.

In a further embodiment of the idle circuit selection algorithm features of the present invention, the customer may further determine certain times of the day and/or days of the week, high or low traffic usage characteristics, circuit or trunk type and the like for selecting one as opposed to another predetermined algorithm. Moreover, the customer may implement their own circuit selection algorithm of their own design via the same or different input means. The present invention is not limited to implementation in a toll network and will find application as well at a local exchange carrier or in a large private network.

These and other features of the present invention will become clear from an appreciation of the drawings and the following detailed description thereof.

DETAILED DESCRIPTION

Figure 1:
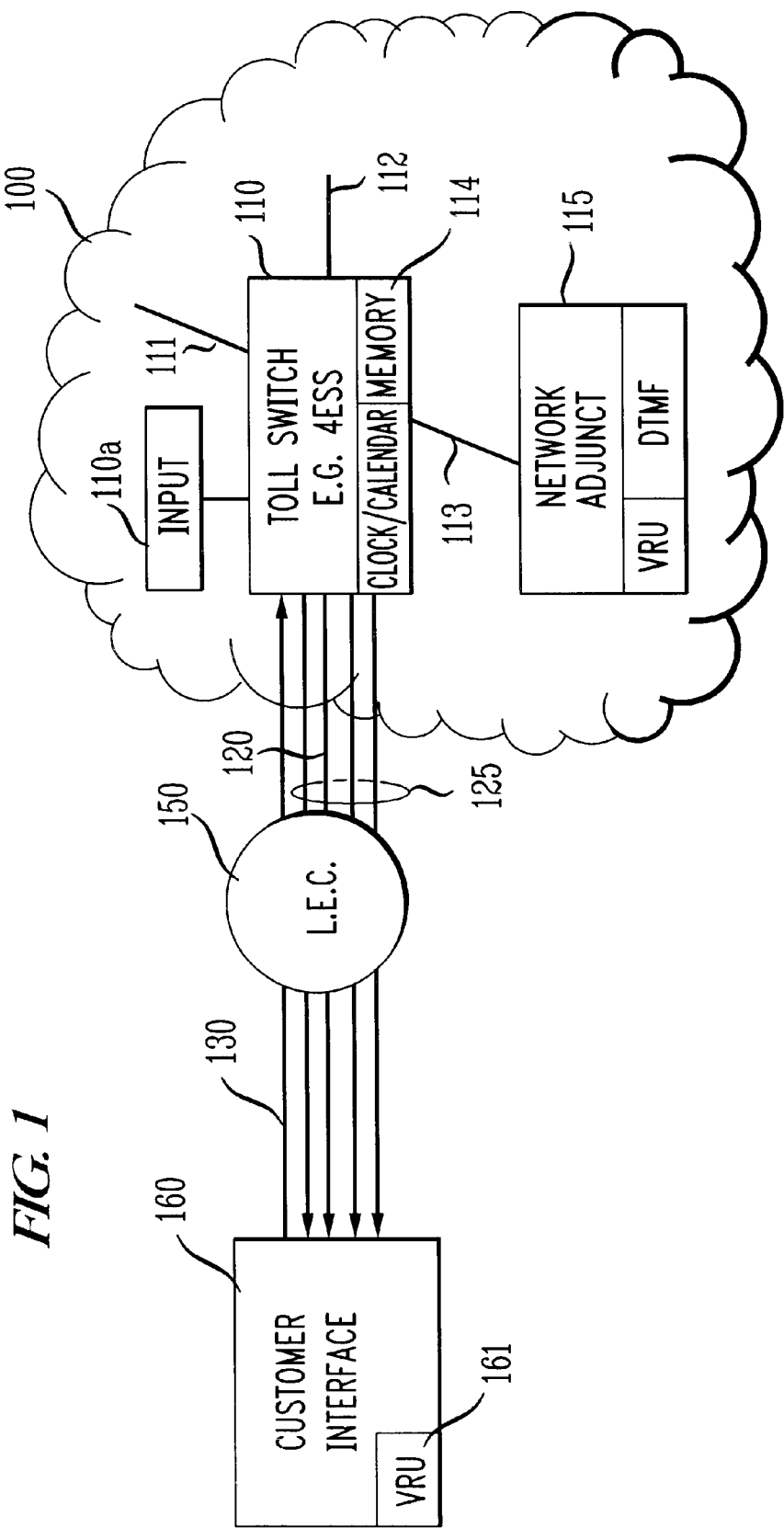
FIG. 1 is a diagram showing a typical network useful for describing, by way of example, either a prior art method of selecting an idle circuit for usage on a call or the method and apparatus of the present invention.
Figure 2:
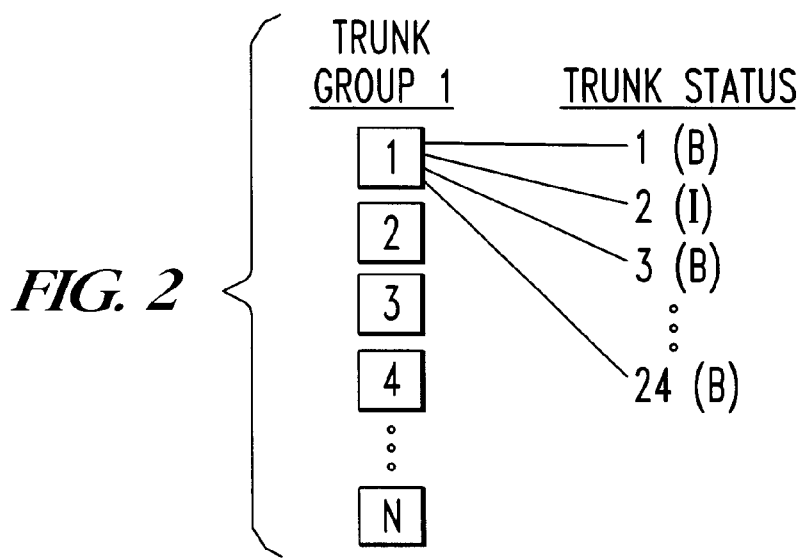
FIG. 2 is a simple diagram showing a plurality of trunk blocks and trunk circuits within trunk groups and busy/idle status for the trunk circuits of trunk group #1, by way of example, for use in an explanation of trunk selection according to the prior art or according to the present invention.

Referring to FIG. 1, there is shown a pictorial representation of a typical telecommunications network including a toll network portion 100. The telecommunications network of FIG. 1 has already been described in the Background of the Invention section above and comprises a toll switch 110, for example, which is modified according to the present invention to include an input means 110a for inputting customer data. Typically, toll switch 110 comprises a controller for controlling switching and trunk group or circuit selection and memory. According to the present invention, the memory is coupled to the input means 110a for permitting input of customer data such as a trunk or other circuit selection algorithm of the customer's design or one not provided by the manufacturer of the switch 110. Moreover, input means 110a may permit the input of customer preference data, for example, of their selection of a circuit selection algorithm in accordance with customer defined criteria. The customer defined criteria may be the time of day, the day of week, use this selection algorithm for these circuits and another selected algorithm for other circuits, use this algorithm for high traffic periods and this for low traffic periods and so on. The circuits selected may be one way trunk groups, two way trunk groups, outgoing trunks or service circuits such as dual tone multi-frequency receivers or voice response units, by way of example. As used herein, by "outgoing" is intended a direction of connection from the toll network 100 through LEC 150 toward customer 160. For example, four outgoing trunk groups are shown 125 including first trunk group 120 (from toll network 100 toward customer 160).

Figure 3:
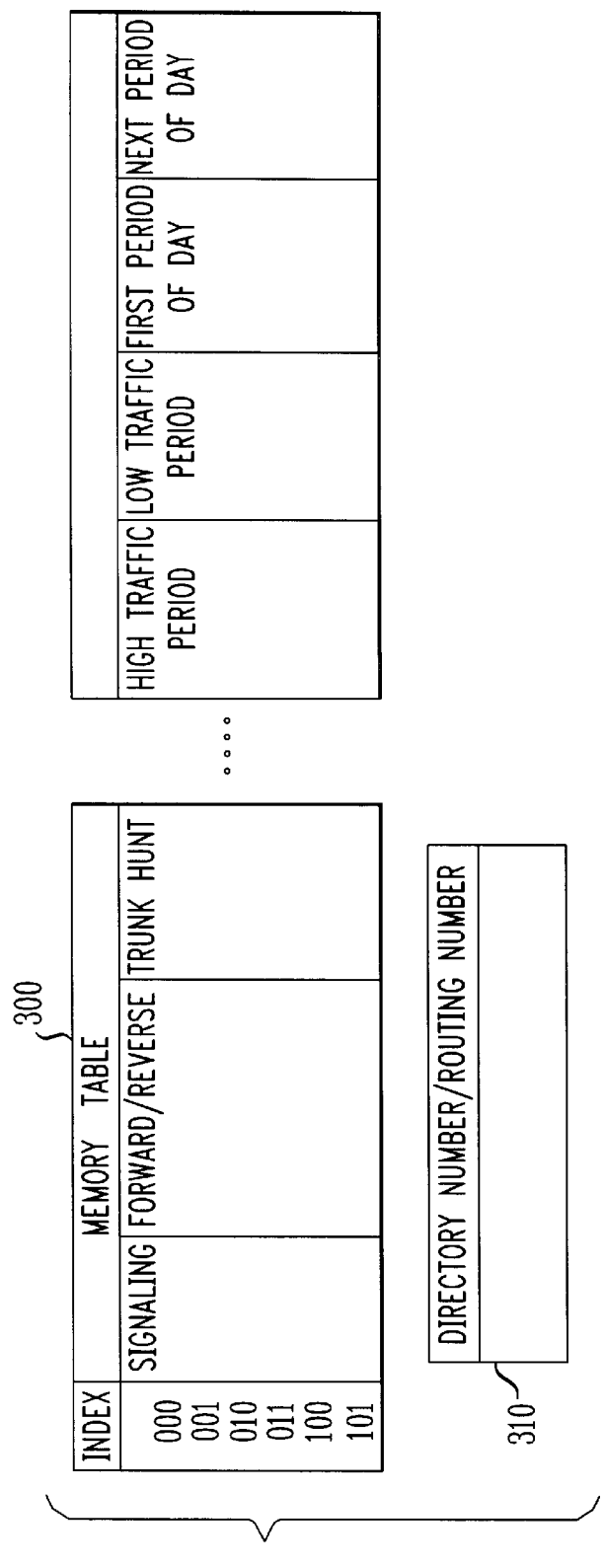
FIG. 3 shows an example of memory tables for storing in memory of a switching center a plurality of different trunk hunt selection algorithms and an indexing means for accessing each algorithm as well as a directory number/routing number translation table for outputting an index for selecting a particular trunk circuit selection algorithm according to customer preference per the present invention.

FIG. 3 shows an exemplary organization of a memory of a switch, such as a #4ESS switch, and according to the present invention. A memory table 300 is provided for defining trunk hunt or circuit selection algorithms. There may be as many circuit selection algorithms as only limited by the imagination. As described above, the trunk circuit selection algorithms known in the art comprise, for example, the following: lowest idle circuit first, highest idle circuit first, Asequential (on the first call, select the first circuit, then the second circuit and so on), least used circuit, longest idle circuit, normal #4ESS selection algorithm and custom circuit selection. Others include most idle, least hunted; most busy, most hunted; and circular trunk hunt or circuit selection. In fact, as a customer desires, a new index may be provided such as binary index 110 (decimal 6) for selecting a new algorithm entered by the customer that may not be available the customer's serving switch 110 or may be of the customer's own design. For example, binary index 000 into table 300 may refer to lowest idle circuit first, 001, highest idle circuit first and so on. This selected order is exemplary only and the selected order in fact may be any order.

Second memory table 310 performs a directory number/ routing number to index translation. That is, when a call is received, the directory number/routing number is regarded by the switch controller and an index is output depending on the number input. The index then corresponds in table 300 to a customer selected circuit selection algorithm. According to a further feature of the present invention, switch 110 may be provided with a time of day and day of week clock or schedule or time table. The customer may input further criteria providing for selection of one circuit selection algorithm at one time of day and another circuit selection algorithm at another time of day. Moreover, there may be intermediate tables provided (not shown) for permitting indexing of selection algorithms according to trunk group, service circuit, incoming trunk group, two way trunk group, high traffic period, low traffic period and the like.

Figure 4:
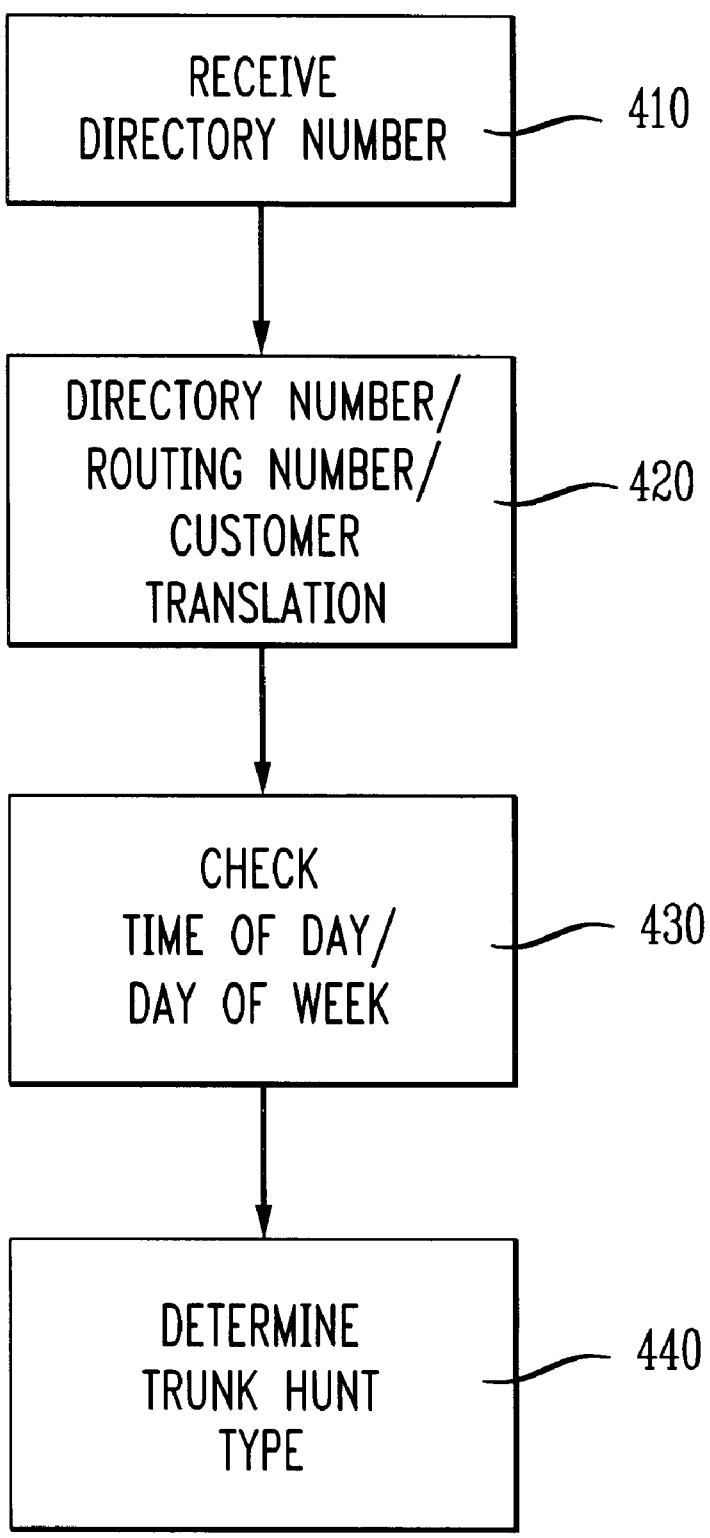
FIG. 4 shows a simple flowchart for permitting automatic customer preference selection of a trunk circuit selection algorithm as a call is received at a switching center according to the present invention.

The method of the present invention will now be discussed briefly while referring to FIG. 4. A dialed directory number is received at a toll switch at step 410. The directory number is used to obtain a routing number at 420 and further to obtain a customer identity. A table is then referred to determine what the customer criteria is for circuit selection. For example, if the circuit selection is an outgoing trunk group and/or a circuit selection, then one or more indices is determined from table 310 into table 300 for obtaining an outgoing trunk circuit and/or a service circuit selection algorithm predetermined and selected by the customer. At optional step 430, the time of day and day of week may be determined. Intermediate tables may be required, not shown in FIG. 3, for varying the predetermined index from referring to one algorithm or another depending on time of day, day of week, high traffic period, low traffic period and the like. Then, at step 440, the one or more circuit hunt or selection algorithm is positively determined for a call and a controller operatively selects a circuit according to the predetermined algorithm. Many customers have unique needs in delivery and transmission of calls to/from their businesses. The present invention provides for different types of circuit selection algorithms, including custom designed algorithms. By way of example, a network may allow a manual assignment of the order in which circuits should be selected, for example, both by first idle and A-sequentially in that order if the customer so chooses, perhaps by time of day or day of week, low or high traffic period and the like. The normal switch circuit selection algorithm may be a default choice in the event the customer does not wish to make a choice.

Thus, there has been shown and described a method and apparatus for providing customer preference and selection of a circuit selection algorithm which may be applied, for example, for selecting among a plurality of possible algorithms for selecting an outgoing idle trunk circuit/facility. The invention may be similarly used for selecting among other trunk circuit types and among service circuits and used in a local, toll or large private network. The telecommunications traffic may comprise voice, data, voice and data, video or other telecommunications traffic. The invention should only be deemed to be limited by the scope of the claims that follow.

What we claim is:

1. A method of providing for customer selection of a trunk group selection algorithm for use in a public network switching center comprising the steps of maintaining a time of day and day of week clock in a memory of said public network switching center, maintaining a first table of a plurality of trunk group selection algorithms in said public network switching center memory, permitting a customer to access said first table of trunk group selection algorithms in said public network switching center memory, receiving customer data defining a preferred trunk group selection algorithm for a first period of time and a second, different trunk group selection algorithm for a different period of time than said first period of time, maintaining said first table with said customer preferred and different trunk group selection algorithms for the first and different periods of time in said public network switching center memory, indexing by a customer identification code said first table with said customer preferred and different trunk group selection algorithms for said first and second periods of time in said public network switching center memory, maintaining a plurality of customer identification codes, for different customers, in said first table with said customer preferred and different trunk group selection algorithms for said first and different periods of time in said public network switching center memory, maintaining a second table of a plurality of customer identification codes, for different customers, in said public network switching center memory, indexing by a routing number said second table with said customer identification codes, receiving a dialed telephone number from a calling party, translating said dialed telephone number into a routing number, accessing said second table with said plurality of routing numbers, determining a customer identification code for a particular customer from the routing number, accessing said first table with said customer preferred and different trunk group selection algorithms for said first and different periods of time in said public network switching center memory indexed by customer identification code, determining a current time of day and day of week in order to select a customer preferred trunk group selection algorithm in accordance with one of said first and different periods of time, matching a customer preferred trunk group selection algorithm with the customer identification code in response to the current time of day and day of week, in accordance with a selected customer preferred trunk group selection algorithm, selecting a trunk group, and utilizing said selected customer preferred trunk group selection algorithm for delivery of calls to said particular customer.

2. A method as recited in claim 1 further comprising the steps of receiving customer data defining a preferred trunk group selection algorithm for a first threshold of data traffic and a second, different trunk group selection algorithm for a different threshold of data traffic than said first threshold of data traffic, maintaining said first table with said customer preferred and different trunk group selection algorithms for the first and different thresholds of data traffic in said public network switching center memory, indexing by a customer identification code said first table with said customer preferred and different trunk group selection algorithms for said first and different thresholds of data traffic in said public network switching center memory, maintaining a plurality of customer identification codes, for different customers, in said first table with said customer preferred and different trunk group selection algorithms for said first and different thresholds of data traffic in said public network switching center memory, maintaining a second table of a plurality of customer identification codes, for different customers, in said public network switching center memory, indexing by a routing number said second table with said customer identification codes;

receiving a dialed telephone number from a calling party, translating said dialed telephone number into a routing number, accessing said second table with said plurality of routing numbers, determining a customer identification code for a particular customer from the routing number, accessing said first table with said customer preferred and different trunk group selection algorithms for said first and different thresholds of data traffic in said public network switching center memory indexed by customer identification code, determining a threshold of data traffic in order to select a customer preferred trunk group selection algorithm in accordance with one of said first and different thresholds of data traffic, matching a customer preferred trunk group selection algorithm with the customer identification code in response to the current time of day and day of week, and in accordance with a selected customer preferred trunk group selection algorithm, selecting a trunk group for delivery of calls to said particular customer.

3. A method as recited in claim 2 further comprising the preliminary step of maintaining a default trunk group circuit selection algorithm in said first table with said preferred and different trunk group selection algorithms for said first and different thresholds of data traffic in said public network switching center memory indexed by customer identification code until receipt of customer data defining a preferred trunk group selection algorithm for a first threshold of data traffic and a second, different trunk group selection algorithm for a different threshold of data traffic than said first threshold of data traffic.

4. A method as recited in claim 1 further comprising the preliminary step of maintaining a default trunk group circuit selection algorithm in said first table with said preferred and different trunk group selection algorithms for said first and different periods of time in said public network switching center memory indexed by customer identification code until receipt of customer data defining a preferred trunk group selection algorithm for a first period of time and a second, different trunk group selection algorithm for a different period of time than said first period of time.

5. An apparatus for providing for customer selection of a trunk group selection algorithm for use in a public network switching center comprising a clock for maintaining time of day and day of week in a memory of said public network switching center, a first table of a plurality of trunk group selection algorithms in said public network switching center memory, input means for permitting a customer to access said first table of trunk group selection algorithms in said public network switching center memory, input means for receiving customer data defining a preferred trunk group selection algorithm for a first period of time and a second, different trunk group selection algorithm for a different period of time than said first period of time, said first table with said customer preferred and different trunk group selection algorithms for the first and different periods of time in said public network switching center memory indexed by a customer identification code with said customer preferred and different trunk group selection algorithms for said first and different periods of time in said public network switching center memory, said first table maintaining a plurality of customer identification codes, for different customers, with said customer preferred and different trunk group selection algorithms for said first and different periods of time in said public network switching center memory, a second table of a plurality of customer identification codes in said public network switching center memory, said second table with said customer identification codes in said public network switching memory indexed by a routing number with said customer identification codes in said public network switching center memory, said second table maintaining a plurality of routing numbers, for different customers, with said customer identification codes in said public network switching center memory, and a controller for receiving a dialed telephone number from a calling party, translating said dialed telephone number into a routing number, accessing said second table with said customer identification codes in said public switching center memory indexed by routing number, determining a customer identification code for a particular customer from the routing number, accessing said first table with said customer preferred and different trunk group selection algorithms for said first and different periods of time in said public network switching center memory indexed by customer identification code, determining a current time of day and day of week in order to select a customer preferred trunk group selection algorithm in accordance with one of said first and different periods of time, matching a customer preferred trunk group selection algorithm with the customer identification code in response to the current time of day and day of week, and in accordance with a selected customer preferred trunk group selection algorithm, selecting a trunk group for delivery of calls to said particular customer.

6. An apparatus as recited in claim 5 further comprising input means for receiving customer data defining a preferred trunk group selection algorithm for a first threshold of data traffic and a second, different trunk group selection algorithm for a different threshold of data traffic than said first threshold of data traffic, said first table with said customer preferred and different trunk group selection algorithms for the first and different thresholds of data traffic in said public network switching center memory indexed by a customer identification code with said customer preferred and different trunk group selection algorithms for said first and different thresholds of data traffic in said public network switching center memory, said first table maintaining a plurality of customer identification codes, for different customers, with said customer preferred and different trunk group selection algorithms for said first and different thresholds of data traffic in said public network switching center memory, a second table of a plurality of customer identification codes in said public network switching center memory, said second table with said customer identification codes in said public network switching memory indexed by a routing number with said customer identification codes in said public network switching center memory, said second table maintaining a plurality of routing numbers, for different customers, with said customer identification codes in said public network switching center memory, and a controller receiving a dialed telephone number from a calling party, translating said dialed telephone number into a routing number, accessing said second table with said customer identification codes in said public switching center memory indexed by routing number, determining a customer identification code for a particular customer from the routing number, accessing said first table with said customer preferred and different trunk group selection algorithms for said first and different thresholds of data traffic in said public network switching center memory indexed by customer identification code, determining a threshold of data traffic in order to select a customer preferred trunk group selection algorithm in accordance with one of said first and different thresholds of data traffic, matching a customer preferred trunk group selection algorithm with the customer identification code in response to the current time of day and day of week, and in accordance with a selected customer preferred trunk group selection algorithm, selecting a trunk group for delivery of calls to said particular customer.

7. An apparatus as recited in claim 6 further comprising the preliminary element of said first table, with said preferred and different trunk group selection algorithms for said first and different thresholds of data traffic in said public network switching center memory indexed by customer identification code, maintaining a default trunk group circuit selection algorithm until such time as customer data defining a preferred trunk group selection algorithm for a first threshold of data traffic and a second, different trunk group selection algorithm for a different threshold of data traffic than said first threshold of data traffic is received.

8. An apparatus as recited in claim 3 further comprising the preliminary element of said first table, with said pre-ferred and different trunk group selection algorithms for said first and different periods of time in said public network switching center memory indexed by customer identification code, maintaining a default trunk group circuit selection algorithm until such time as customer data defining a preferred trunk group selection algorithm for a first period of time and a second, different trunk group selection algorithm for a different period of time than said first period of time is received.

* * * * *

UNITED STATES PATENT AND TRADEMARK OFFICE
CERTIFICATE OF CORRECTION

PATENT NO. : 6,490,347 B2
DATED : January 6, 2003
INVENTOR(S) : C. L. DeCaluwe et al.

It is certified that error appears in the above-identified patent and that said Letters Patent is hereby corrected as shown below:

Title page,
Item [56], References Cited, U.S. PATENT DOCUMENTS, two additional should be included:

-- 4,757,267 * 7/1988 Riskin.........379/113
   5,036,535 * 7/1991 Gechter.......379/210 --

Signed and Sealed this

Eighth Day of April, 2003

JAMES E. ROGAN
*Director of the United States Patent and Trademark Office*